United States Patent Office 3,171,748
Patented Mar. 2, 1965

3,171,748
COCOA BUTTER CONTAINING FAT MIXTURE
Hendrik Galenkamp, Amsterdam, Netherlands, assignor to N.V. Verenigde Textiel- & Oliefabrieken Afd. Crok & Laan, Wormerveer, Netherlands, a limited-liability company of the Netherlands
No Drawing. Filed Dec. 11, 1961, Ser. No. 158,530
Claims priority, application Netherlands, Dec. 14, 1960, 259,019
4 Claims. (Cl. 99—118)

In the literature examples are known to make chocolate better temperature resistant at high ambient temperatures such as e.g. in the tropics by the use of oils hardened to an iodine number lower than 1 (J. Am. Oil Chem. Soc., 36, 4 (1960). Confectionery Production, 24, 202 (1958)). To achieve a suitable effect rather large amounts of these products should be used and therefrom various difficulties result in respect of the treatment of chocolate made with these products.

When tempering the chocolate the saturated triglycerides of these fats crystallize and thereby increase the viscosity of the chocolate so that it cannot be used any more in the usual manner (molding or bars, covering). Moreover the eating quality strongly decreases with increasing amounts of saturated triglycerides. The chocolate becomes "waxy."

When decreasing the viscosity by increase of temperature the crystallized cocoa butter triglycerides melt again, so that no rapid solidification takes place after casting and bloom occurs within a very short time.

Also Borneo tallow has been used as a means to render chocolate better temperature-resistant. (See e.g. "The Chemistry, Flavouring and Manufacture of Chocolate Confectionery and Cocoa," by H. R. Jensen, published by J. & A. Churchill Ltd., London, 1931, pp. 205–207.) Borneo tallow has the advantage of resembling cocoa butter closely in its glyceride structure and owing thereto in its solidification behavior. Therefore the difficulties as with the hardened fats do not occur with this product. In order to obtain a suitable effect, however, rather large amounts should be used. Moreover this product is not always available and its price can mount highly.

It has now been found that with application of a Shea fat fraction satisfying the following requirements.

Softening point: higher than 38° C.
Solidification point according to the Jensen method (for description of the Jensen method, see "Oils, Fats and Fatty Food," by K. A. Williams, third ed., 1950, pp. 75–76, published by J. & A. Churchill Ltd., London) higher than 36°.

Solid material at: Percent
- 30° C. _____ 100
- 32.5° C., more than _____ 85
- 37.5° C., more than _____ 35
- 45° C., less than _____ 5

In a chocolate product effects can be achieved which are equal or greater than those which can be achieved with Borneo tallow in a dose amounting to half that of Borneo tallow.

This appears from the following table in which the percentages of solids at various temperatures and the data derived from the solidification curves according to Jansen (see supra) are represented.

Column I of this table relates to cocoa butter.
Column II to a mixture of 90%.
Cocoa butter and 10% of a Shea fat fraction prepared in the manner described in Example I.
Column III of the table relates to a mixture of 90% of cocoa butter and 10% of Borneo tallow.

|  | I | II | III |
|---|---|---|---|
| Standard time | 38 min | 41 min | 41 min. |
| Crystalliation time | 21 min | 23 min | 34 min. |
| Min. temp | 25.2° C | 26.3° C | 24.5° C. |
| Solidification point | 30.0° C | 31.4° C | 29.9° C. |
| Solids at: | | | |
| 20° C | 98% | 100% | 95%. |
| 25° C | 93% | 98% | 90%. |
| 27.5° C | 83% | 85% | 78%. |
| 30° C | 61% | 66% | 58%. |
| 32.5° C | 24% | 37% | 26%. |
| 37.5° C | 0% | 0% | 0%. |

It clearly appears from this table that even at 32.5° C. the percentage of solids of a mixture of cocoa butter and Shea fat fraction is considerably higher than of a mixture of cocoa butter and Borneo tallow. It is clear that a chocolate product containing a mixture of cocoa butter and Shea fat fraction for this reason has advantages in the tropics.

On the other hand it appears from the table that also when using a mixture of cocoa butter and Shea fat fraction the fat is completely molten at body temperature. Owing thereto the eating qualities of chocolate containing such a mixture are excellent.

It also has appeared that the tempering and further treatments of chocolate when applying a mixture of cocoa butter and Shea fat fraction can be carried out in analogous manner as with chocolate containing cocoa butter as a fat only.

It has been found that the amount of Shea fat fraction incorporated into the chocolate should be a maximum percentage of 30% by weight calculated in respect of the total amount of fat present in the chocolate without perceivably influencing the eating quality. When one is willing to sacrifice something of the eating quality on behalf of the hardness of the chocolate at higher temperature, then the amount of Shea fat fraction may be 80% by weight.

Consequently the invention relates to a process of preparing a cocoa butter-containing mixture of fats, or a chocolate product respectively, characterized in that cocoa butter is mixed with a Shea fat fraction satisfying the above-mentioned requirements, in an amount not surpassing 80% by weight, and preferably not surpassing 30% by weight of the fat present in total and, in the case where a chocolate product is prepared, other ingredients usual for chocolate and well-known to the art-skilled.

The invention is further elucidated in the following example to which it is not restricted, however.

The Shea fat fraction used in this example is prepared as follows:

*Example*

1 kg. of Shea fat is dissolved in 5 l. of acetone, so that the temperature of the solution is 45° C. The solution is cooled to approximately 27° C. and maintained at said temperature for some time. The unsaponifiable material present in the fat which does not dissolve entirely in the acetone flocculates out still further and precipitates. The solution is decanted from this material and cooled to 15–20° C. and maintained at said temperature during 1 hour. The crystalline material formed thereupon is removed by filtration and washed with acetone of 15–20° C. and the solvent is removed.

The product thus obtained is mixed with such an amount of a mixture of cocoa mass (about 55% of cocoa butter) and sugar, rolled to the desired fineness, that the final product contains an amount of Shea fat fraction being 20% by weight of the amount of fat present in total. The mixture is tempered and poured. Thus a chocolate is obtained which retains the derived degree of hardness even at tropical temperature.

I claim:
1. Composition consisting essentially of cocoa butter and from about 10% to maximally 80% by weight Shea fat fraction, said fraction having
   (a) softening point higher than 38° C.,
   (b) solidification point according to the Jensen method higher than 36° C., and
   (c) 100% by weight solids at 30° C., more than 85% by weight solids at 32.5° C., more than 35% by weight solids at 45° C.

2. Composition of claim 1 wherein said Shea fat fraction is maximally 30% by weight.

3. Chocolate composition comprising cocoa, sugar, cocoa butter and from about 10% to maximally 80% by weight Shea fat fraction, said fraction having
   (a) softening point higher than 38° C.,
   (b) solidification point according to the Jensen method higher than 36° C., and
   (c) 100% by weight solids at 30° C., more than 85% by weight solids at 32.5° C., more than 35% by weight solids at 37.5° C. and less than 5% solids at 45° C.

4. Composition of claim 3 wherein said cocoa butter is about 55% by weight.

References Cited by the Examiner

UNITED STATES PATENTS

| | | | |
|---|---|---|---|
| 2,942,984 | 6/60 | Wissebach | 99—118 |
| 3,012,891 | 12/61 | Best et al. | 99—118 |
| 3,093,480 | 6/63 | Arnold | 99—118 |

A. LOUIS MONACELL, *Primary Examiner.*

TOBIAS E. LEVOW, *Examiner.*